United States Patent Office 2,728,060
Patented Dec. 20, 1955

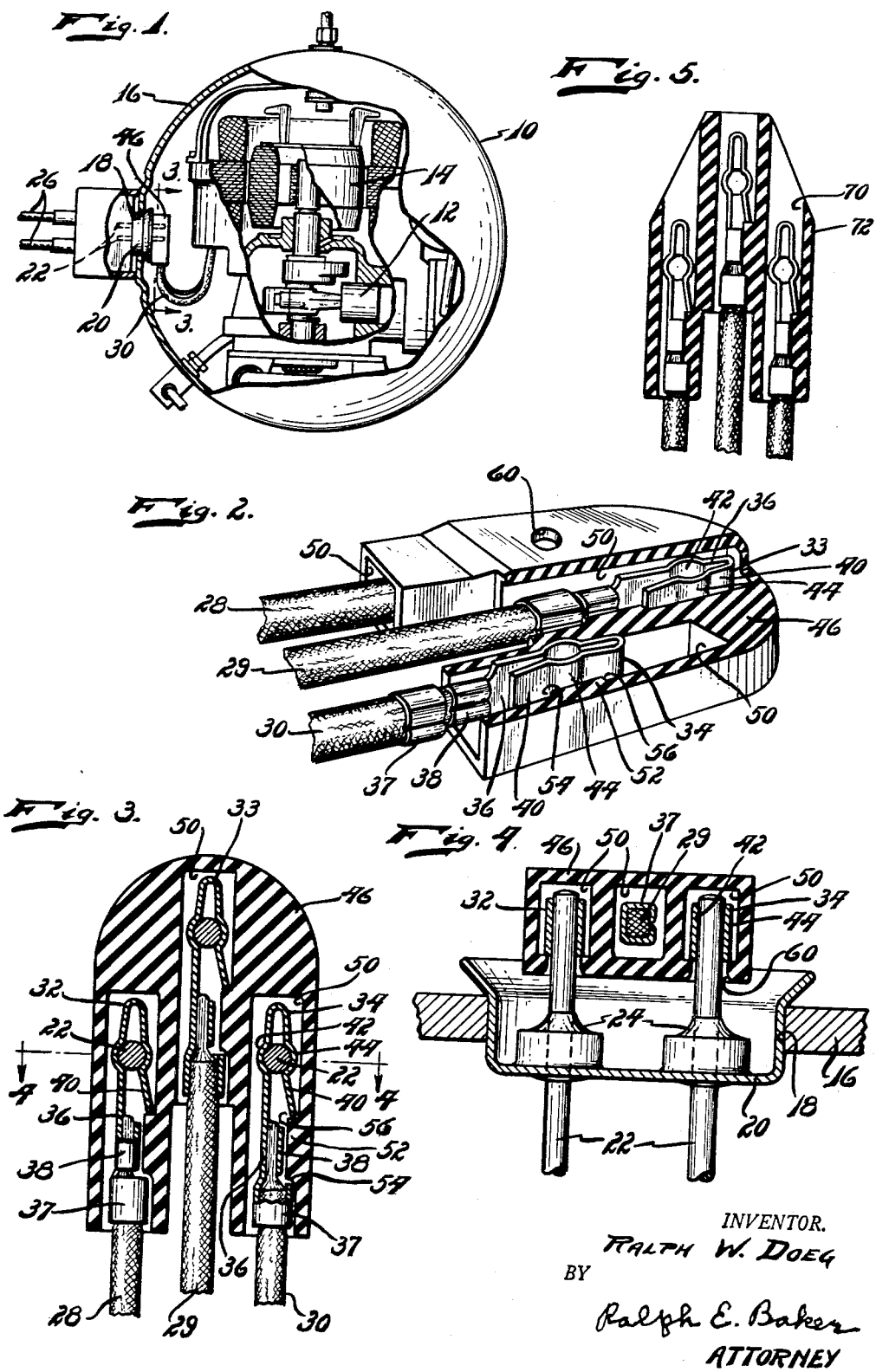

2,728,060

REFRIGERATING APPARATUS

Ralph W. Doeg, Detroit, Mich., assignor to American Motors Corporation, Detroit, Mich., a corporation of Maryland Application August 13, 1954, Serial No. 449,571

5 Claims. (Cl. 339—191)

The present invention pertains to a refrigerating apparatus and more particularly to an electrical connector for use in hermetically sealed motor-compressor units and the like.

In hermetically sealed refrigerant compressors there are provided a number of electrical current carrying terminal posts that project through the shell enclosing the motor and compressor. The external portion is connected in a well known manner to a suitable source of power. The internal end is connected to electrical leads of a motor for driving the compressor. In the manufacture and assembly of the unit the leads are individually secured to a respective post and often they are switched to improper posts resulting in costly repairs particularly should the shell be sealed. To overcome this objection the terminal ends of the leads were assembled in a housing to form a plug type arrangement. However, this proved costly and cumbersome as expensive tools were required to assemble the ends of the leads and housing together. To provide an arrangement that can be inexpensively assembled without the use of tools and whereby the clips are arranged in a cluster for a plug interconnection with the terminal post is an object of the present invention.

Another object of the present invention is to provide for an electric motor on its lead wires terminal connectors which may be used independently for interconnecting to an electrical connection, or whereby the connectors may be readily assembled and locked in an arrangement within a housing as a unitary plug-in assembly.

Another object of the present invention is to provide a terminal connector assembly whereby the resilient connectors are assembled in a housing in a self locking arrangement and whereby the self-locking arrangement is such that the connectors may align itself to the complementary prongs or post to which interlocking arrangement is desired for an electrical connection.

Further objects and advantages of the present invention will be apparent from the following description, reference being had to the accompanying drawings, wherein a preferred form of the invention is clearly shown.

In the drawings:

Fig. 1 is an elevational view of a refrigerant compressor with parts broken away and parts shown in section illustrating the invention applied;

Fig. 2 is a perspective view of the invention with parts broken away and parts shown in section and illustrating a manner of assembly of one of the clips;

Fig. 3 is a sectional view taken along line 3—3 of Fig. 1;

Fig. 4 is a view taken along line 4—4 of Fig. 3; and

Fig. 5 is a sectional view of a modified form of the invention.

Shown in the drawing is a refrigerator compressor assembly 10 comprising a compressor 12 driven by an electromagnetic motor 14. The compressor 12 and motor 14 are hermetically sealed within shell 16. Provided in the wall of the shell 16 is an opening 18 within which is secured a cup-shaped member 20. Extending through to opposite sides of the cup-shaped member 20 through openings formed therein are electrical terminal posts 22. Each terminal post 22 is sealed about the opening in the member 20 to prevent leakage of refrigerant and oil therethrough by sealing compound 24. The posts 22 are connected on their ends extending externally of the shell by electrical wires 26 which are connected to a suitable source of electrical power supply.

Connected to and leading from the motor 14 are electric lead wires 28, 29 and 30 the ends of which are provided with resilient connector clips 32, 33 and 34 respectively. Each clip is similarly formed of an electrical conducting metallic strip 36. One end of the metallic strip 36 is formed with a pair of clasps 37 and 38 for securement of the lead wire. The clasp 37 embraces the complete insulated lead wire, while the clasp 38 embraces the skinned or bare wire for electrical flow conduction therebetween. The opposite end of the strip is bent to form a reversely extended leg 40. The leg 40 is of shorter length than the main body of the strip 36 and is adapted to flex away from the main body of the strip 36. Semi-circular indentations 42 are formed in strip 36 in opposed relation to a semi-circular indentation 44 in the leg 40. The main body or longer portion of the strip 36 extends from the terminal or clasp end thereof to the point where same is bent to form the leg 40.

Each of the clips 32, 33 and 34 are adapted to enter and become self-locking in a housing 46. The housing 46 is preferably molded of non-electrical conducting material and is formed with a plurality of passages 50. The passages 50 are formed with an end opening through an end wall of the housing, the opposite end of the passages are closed. An off-set portion 52 extends into the passage to form a restriction in the passage and an abutment shoulder 54 that faces the open end of the passage, and a second abutment shoulder 56 that faces the closed end of the passage.

The clips 32, 33 and 34 are inserted into a respective elongated slot or passage 50 of the housing 46. As the free leg 40 of the clip normally tends to flex away from the main body of strip 36 it will, as the clip passes the off-set portion 52 spring outwardly to engage the shoulder abutment 56 thereby preventing withdrawal of the clip. To limit the inward movement of the clip the clasp section 37 of the clip will abut the shoulder 54. The clasp 54 is of greater width than the passage narrowed by the off-set portion 52. By the clasp 37 engaging the shoulder 54, and the leg 40, the shoulder 56, the clip is definitely located in the housing for alignment with a respective laterally directed opening 60 extending from the passage through the top wall of housing 50. However the clip can also be located in the passage by limiting the depth of the passage from the shoulder 54 to fit the length of the leg 40.

The insertion of the clips into the housing forms a clustered arrangement of the clips in a plug arrangement complementary to the arrangement of the terminal posts 22 in the cup-shaped member 20. The posts 22 are adapted to enter the opening 60 and pass between the indented portions 42 and 44 to be firmly gripped therebetween by the strip 36 and leg 40. The leg 40 is limited in its movement by the width of the passage, and as the semi-circular indentations combine to form a slightly smaller diameter opening than the diameter of the post, the entrance of the post therebetween will be frictionally tight to provide a good electrical contact therebetween. It will be noted that the clips have sufficient freedom of movement to self-align itself upon the post as contact is being made so that the legs will parallel the entrance of the posts therebetween and thereby provide a maximum of surface contact between post and clip for efficient electrical conduction.

It will be noted that the assembly of the clips into the housing can be readily accomplished at will as no tools or equipment is necessary. The clips are so made that they can, if desired, be readily connected to the posts without the need of the housing. By arranging the clips in the housing a ready plug is formed which can easily be inserted upon the clustered prongs, or removed as an assembly.

In the modified form shown in Fig. 5 the passages 70 are opened at both ends, being extended through the housing 72. This arrangement permits the insertion of a tool against the free leg of the clip to disengage it from the shoulder abutment and permit the clip to be withdrawn.

Although only a preferred form of the invention has been illustrated, and that form described in detail, it will be apparent to those skilled in the art that various modifications may be made therein without departing from the spirit of the appended claims.

I claim:

1. In a device of the character described the combination with a non-conducting member having an elongated slot and an off-set portion extending into said slot, an electrical conductor having a terminal clip secured on one end thereof for insertion into said slot, said terminal clip having a main body portion and a movable leg portion formed with said main body portion, said clip being insertable in said slot until said movable leg portion engages in locking relation with said off-set portion to prevent withdrawal of said clip from said slot, and a laterally directed opening leading from said slot for the insertion therethrough of an electrical conducting element for embracement by said main body portion and said leg portion.

2. In a device of the character described the combination with a non-conducting member having elongated slots and an offset portion extending into each of said slots, electrical conductors each having a terminal clip secured on one end thereof for insertion into a respective slot, each of said clips having a main body portion and movable leg portion formed with said body portion, each of said clips being insertable in a respective slot until said movable leg portion engages in locking engagement with a respective offset portion to prevent withdrawal of said clip from said slot, and laterally directed openings leading from each of said slots for insertion therethrough of a respective electrical conducting element for embracement by a respective clip between its main body portion and leg portion.

3. In a device of the character described the combination with a non-conducting member having an elongated slot and an offset portion extending into said slot intermediate its end, an electrical conductor having a terminal clip secured on one end thereof for insertion into said slot, said clip being formed V-shaped with one leg of said clip being formed longer than other, the end of said longer leg formed in clasp for connecting to said conductor, the end of said shorter leg formed free to move relative to said longer leg for engagement with end of said offset portion to prevent movement of said clip in one direction, the opposite end of said offset portion being engaged by said clasp to prevent movement in the opposite direction, and an opening extending through said non-conducting member leading into said slot, said shorter leg and longer leg being in opposed relation below said opening to receive therebetween in embracing relation an insertable body entering through said opening.

4. In a device of the character described the combination with a non-conducting member having a plurality of elongated slots, offset portions extending into each of said slots intermediate the ends of said slot, electrical conductors each having a terminal clip secured on one end thereof, each of said clips being formed with a main body portion and a shorter reversely extending leg portion movable relative to said main body portion, said main body portion being formed with a clasp for securement to a respective conductor, indentations formed in said main body portion in opposed relation to indentations formed in said leg portion, each of said clips being insertable into a respective slot until said leg engages one end of said offset portion preventing movement in one direction and said clasp engaging the opposite end of said offset portion to prevent movement in the opposite direction, and openings extending through said non-conducting member leading into a respective slot between said opposed indentations.

5. In a device of the character described the combination with; electrical conductors, metallic strips secured to ends of each of said conductors, said strips having a main body portion with a reversely bent portion formed therewith, the end of said reversely bent portion adapted to move relative to said main body portion, a non-conducting housing, a plurality of elongated passages formed in said housing each having an offset portion extending into said passage, each of said strips adapted for insertion into a respective passage until said reversely bent portion interlocks with said offset portion to prevent said strip from said passage, openings extending laterally from each of said passages for insertion therethrough of a respective electrical conducting element for engagement with said strip between its main body portion and reversely bent portion said openings intersecting said passages whereby said electrical conducting elements entering therethrough will interlock with said metallic strips to retain said strips with the said non-conducting housing.

References Cited in the file of this patent

UNITED STATES PATENTS

| 1,747,896 | Gates | Feb. 18, 1930 |
| 2,249,977 | Penfold | July 22, 1941 |
| 2,392,438 | Wade | Jan. 8, 1946 |
| 2,540,062 | Touborg | Jan. 30, 1951 |
| 2,628,016 | Higham | Feb. 10, 1953 |
| 2,682,038 | Johnson | June 22, 1954 |